United States Patent [19]

Oetiker

[11] Patent Number: 4,576,359
[45] Date of Patent: Mar. 18, 1986

[54] COUPLING FOR PRESSURE GAS LINES

[76] Inventor: Hans Oetiker, Oberdorfstrasse 21, CH-8810 Horgen, Switzerland

[21] Appl. No.: 589,702

[22] Filed: Mar. 15, 1984

[51] Int. Cl.⁴ ............................................. F16L 37/28
[52] U.S. Cl. .............................. 251/149.6; 251/149.1; 285/314; 285/317
[58] Field of Search .............................. 285/314, 317; 251/149.1, 149.6

[56] References Cited

U.S. PATENT DOCUMENTS

| 464,386 | 12/1891 | Patterson | 285/314 |
| 592,899 | 11/1897 | Wilson | 285/314 |
| 2,449,920 | 9/1948 | Williams | 285/314 |
| 2,478,052 | 8/1949 | Palm | 285/314 |
| 2,771,308 | 11/1956 | Vitcha et al. | 285/317 |
| 4,025,049 | 5/1977 | Schmidt | 285/314 |
| 4,357,037 | 11/1982 | Oetiker | 285/314 |
| 4,413,846 | 11/1983 | Oetiker | 285/317 |

FOREIGN PATENT DOCUMENTS

| 1298378 | 6/1969 | Fed. Rep. of Germany | 285/317 |
| 860216 | 1/1941 | France | 285/314 |
| 2442393 | 7/1980 | France | 285/314 |
| 414280 | 12/1966 | Switzerland | 285/317 |

Primary Examiner—Samuel Scott
Assistant Examiner—Allen J. Flanigan
Attorney, Agent, or Firm—Craig & Burns

[57] ABSTRACT

A coupling for lines carrying gas under pressure in which a tubularly shaped male member is adapted to be inserted into a bore of a sleeve-like female member containing a valve assembly automatically opened upon insertion of the tubularly shaped male member. The tubularly shaped male member which is provided with an annular groove is held in its inserted position by a locking mechanism in the sleeve-like female member which consists of a latching member, a ring-like member surrounding the sleeve-like female member and a spring between the latching member and the ring-like member. For purposes of releasing the locking action of the latching member which is operable to engage in the annular groove by movement in a milled-in recess, the ring-like member is provided with an inwardly projecting actuating element. To permit a reduction in the dimensions of the ring-like member, the latching member includes a short leg portion bent with respect to the main portion of the latching member at such angle as to point toward the actuating member.

14 Claims, 8 Drawing Figures

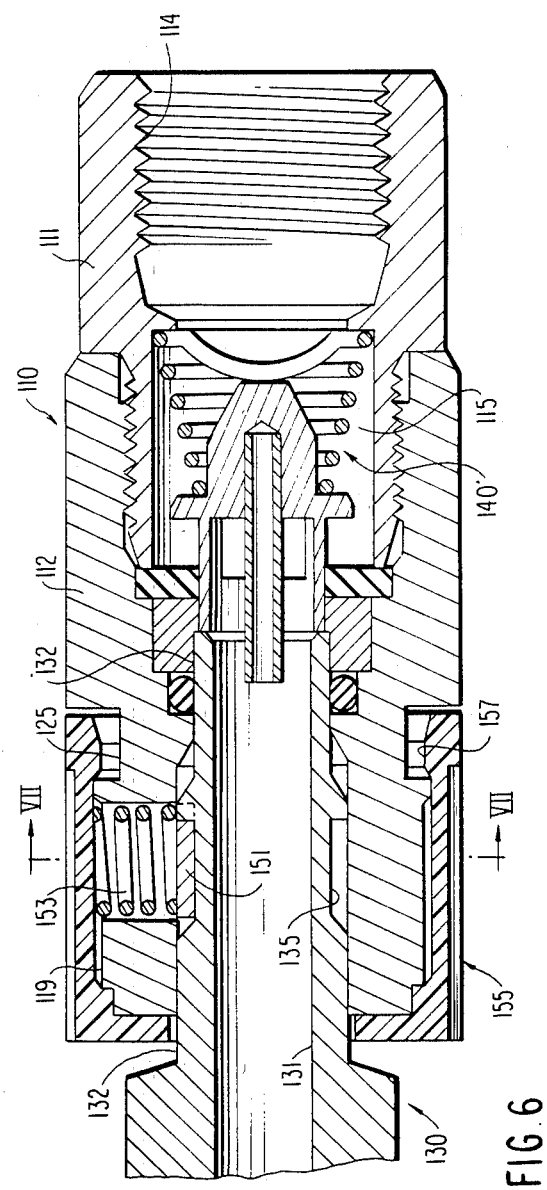
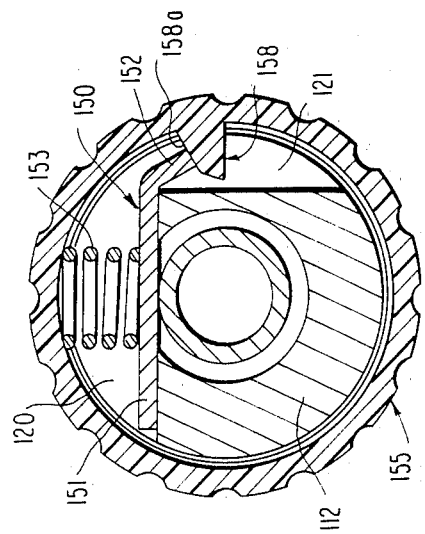
FIG. 6
FIG. 7

COUPLING FOR PRESSURE GAS LINES

The present invention relates to a coupling for pressure gas lines which consists of two members adapted to be detachably connected one within the other in order to extend the line and thus enable the further conduction of the pressure gas.

Many types of couplings are known in the prior art. My prior U.S. Pat. Nos. 2,722,399; 2,795,438 and 3,174,774 are representative of some of my couplings which have proved successful heretofore. In another commercially successful construction of a coupling of this type which has been sold in large quantities and proved very satisfactory from an operational reliability, the latching member is constructed as cylindrical segment and is retained in the engaging position by means of a ring spring. The disengagement of the latching member takes place by means of an outer ring which is provided internally with a cam, connected with the ring from the outside by means of a screw.

The disadvantages of this last-mentioned coupling construction are as follows:

(1) The ring spring is difficult to install and may fatigue in the course of time.

(2) The cylindrical segment requires a relatively large amount of space so that a large outer diameter results for the coupling.

(3) A cylindrical segment is relatively complicated to manufacture because it requires machining and milling and therefore represents a machined part which is rather expensive.

(4) The fastening of the inwardly projecting cam at the outer ring from the outside by means of a screw is also a complicated assembly operation and therefore relatively expensive.

(5) The danger always exists that the screw will become loose in due course.

(6) The cam itself is also relatively complex and expensive.

To obviate these drawbacks, my prior U.S. Pat. No. 4,357,037 proposed a new approach which significantly reduced the costs involved in the manufacture and assembly of the couplings of this type. However, the coupling disclosed in my prior U.S. Pat. No. 4,357,037 which consisted of a rotatable cap-like member provided with an inwardly projecting entrainment member adapted to engage with a latching member made from flat sheet metal material, did not yet permit a reduction in the outside dimensions of the coupling. Such reduction in outside dimensions, without loss in through-flow capacity, becomes important, particularly for all-metal constructions as desired by some customers.

Accordingly, it is the principal object of the present invention to provide a coupling of the type described above which assures low cost in manufacture and assembly, a reduction in outside dimensions and reliable operation without loss of through-flow capacity of the coupling.

The underlying problems are solved according to the present invention in that, differing from my prior U.S. Pat. No. 4,357,037, the latching member which is punched or stamped-out from flat plate material, is bent with its shorter leg portion from its original position at an acute angle pointing toward the inwardly projecting actuating member which, in the case of an all-metal construction, is a rivet secured to the ring member. As a result of this particular configuration of the latching member, in which the shorter leg portion is bent in the direction toward the inwardly projecting actuating member, the actuating member seeks to displace the latching member in the direction of the shorter leg portion during rotation of the ring member in the disengaging direction. This, in turn, permits the diametric dimensions of the ring member to be significantly reduced since the opening movement of the latching member against the spring force which takes place in a more or less pivot-like manner about the free end of the main portion of the latching member, now takes place in the direction of the shorter leg portion.

A coupling made in accordance with the present invention permits a reduction of the maximum outer diameter thereof by about 25%, a reduction in weight of about 30% and a reduction in manufacturing costs of about 30% when the coupling is made completely of metal parts.

In a particularly advantageous construction according to the present invention, the inwardly projecting actuating member is secured to the ring member from the outside by a so-called pop rivet which, in addition to the function as actuating member, then also secures the ring on the housing of the coupling so as to prevent it from falling off. This type of manufacture offers the significant advantage that an extraordinarily rapid assembly is made possible and the coupling cannot be disassembled by unauthorized persons. On the other hand, any disassembly necessary for repairs is extraordinarily simple for the manufacturer of these couplings because the pop rivet can be simply bored-out and then be replaced with a new once, once the repair is completed. Even under strongest vibrations, these pop rivets cannot become loose, thereby eliminating any accident danger.

If the present invention is applied to a coupling with a plastic cap-like member as disclosed in my prior U.S. Pat. No. 4,357,037, the advantages of smaller outside dimension and reductions in weight on the part of the housing can also be achieved. However, in that case, the inwardly projecting integrally molded actuating member is provided with an actuating surface disposed at such an angle as to be substantially parallel to the flat end face of the shorter leg of the latching member. This will also assure an actuation of the latching member substantially in the direction of the shorter leg thereof when the cap-like ring member is rotated in the disengaging direction.

These and further objects, features and advantages of the present invention will become more apparent from the following description when taken in connection with the accompanying drawing which shows, for purposes of illustration only, two embodiments in accordance with the present invention, and wherein:

FIG. 4 is a plan view on the latching member of FIG. 3;

FIG. 6 is an axial longitudinal cross-sectional view through a modified embodiment of a coupling in accordance with the present invention; and FIG. 7 is a transverse cross-sectional view taken along line VII—VII of FIG. 6.

Figure 2:
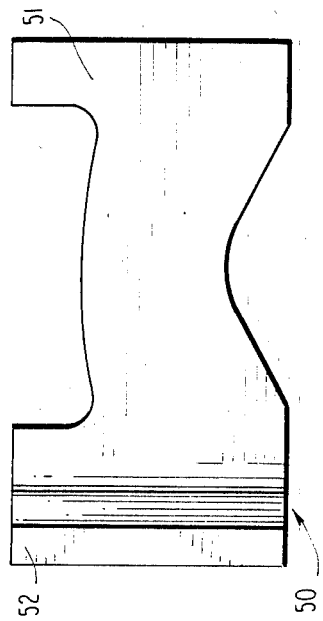
FIG. 2 is a transverse cross-sectional view, taken along line II—II of FIG. 1.
Figure 3:
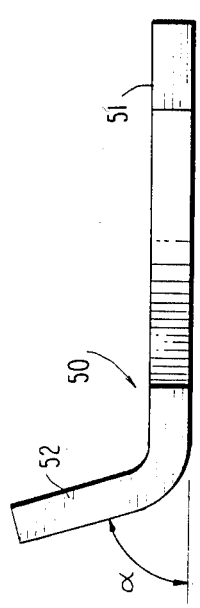
FIG. 3 is a front elevational view of the stamped-out latching member in accordance with the present invention, after being bent into its proper position.

Referring now to the drawing, wherein like reference numerals are used throughout the various views to designate like parts, and more particularly to FIGS. 1–4, the coupling in accordance with the present invention is composed of a two-partite sleeve-like member generally designated by reference numeral 10 which forms the female coupling part, and of a tubularly shaped member generally designated by reference numeral 30 which forms the male coupling part and is in the form of a nipple or the like. The two-partite sleeve-like member 10 includes a right sleeve-like coupling part 11 containing a normally closed valve assembly generally designated by reference numeral 40 and screwed together with the left sleeve-like coupling part 12 at 13. The right sleeve-like part 11 is provided with a threaded connecting bore 14 or the like for connection with the pressure line (not shown) carrying pressure gas. The internal bore 14 is connected by way of a bore 16 of reduced dimension with an internal chamber 15 containing the valve assembly 40.

The left sleeve-like coupling member 12 is provided with an internal bore 18, the diameter of which is related to the outer diameter of the tubularly shaped male member 30. The bore 18 is connected by way of a tapering section with a short bore section 29 of reduced diametric dimensions which leads into the chamber 15.

As can be best seen in FIG. 2, the left coupling part 12 is provided with two milled-out recesses 20 and 21 disposed at right angle to one another, of which the milled-out recess 20 intersects with the internal bore 18 to provide a direct communication between the inside of the bore 18 and the milled-out recess 20.

The tubularly shaped male coupling member 30 is provided with an internal bore 31 for conducting therethrough the pressure gas, once the valve 40 is opened when the tubularly shaped male coupling member 30 is inserted into and locked-in within the sleeve-like coupling member 10. The tubularly shaped male coupling member 30 which may be of any conventional construction for connection with a pressure line extension, includes a first portion 32 of a diametric dimension complementary to the dimension of the internal bore 18 and a second diametric portion 33 of reduced diametric dimension, complementary to the internal bore 29. Additionally, the tubularly shaped male coupling member 30 is provided with a circumferentially extending groove 35 at such location that it will be in substantial axial alignment with the milled-out recess 20 when the tubularly shaped male coupling member 30 is in its engaged position within the sleeve-like coupling member 10. To avoid energy losses, when no connecting nipple 30 is inserted into the sleeve-like coupling member 10, the valve assembly generally designated by reference numeral 40 is urged into its closing position by a spring 41 in such a manner that the annular sealing surfaces 42 thereof engage the gasket or packing 43 suitably seated in a corresponding recess provided in the sleeve-like female coupling part 12. An annular actuating disk 44 which is integral with the remaining valve structure 40, for example, by way of ribs 45 is adapted to be engaged by the free end face of the tubularly shaped male coupling part 30 when the latter is inserted into the bore 18 so as to open the valve structure 40 when the tubularly shaped male coupling part 30 reaches its engaged, locked position.

As disclosed in my prior U.S. Pat. No. 4,357,037, the locking arrangement in accordance with the present invention basically involves also only three parts; namely, a latching member generally designated by reference numeral 50 (FIGS. 3 and 4), a coil spring 53 (FIGS. 1 and 2) and a ring member generally designated by reference numeral 55 which is provided with an inwardly projecting actuating element generally designated by reference numeral 58. Except for dimensions and certain details to be described more fully hereinafter, the coupling so far described is similar to that disclosed in my prior U.S. Pat. No. 4,357,037.

Differing from my prior U.S. Pat. No. 4,357,037, the latching member 50 which is again punched or stamped-out out of flat material, consists of a flat main portion 51 and of a shorter leg portion 52 which is bent at an angle $\alpha$ (FIG. 3) with respect to the original position corresponding to the plane in which the main flat portion 51 lies in such a manner that it points toward the inwardly projecting actuating element 58. The angle $\alpha$ may be of the order of 60° to 80°, in the illustrated embodiment, is about 75°. By bending the shorter leg portion 52 in the manner shown in FIGS. 2 and 3, it is possible to reduce the overall diametric dimension of the coupling, particularly insofar as it relates to the diametric dimensions of the ring member 55. This is important with an all-metal construction in which savings in weight and material are an important factor.

In the embodiment illustrated in FIGS. 1–4, the ring member 55 is rotatable on the end portion 19 of the left sleeve-like coupling part 12, which is of such reduced diametric dimension that the outer surface of the ring member 55 is substantially flush with the outer surfaces of the sleeve-like coupling member 10. These reduced dimensions of the coupling are possible in accordance with the present invention since rotation of the ring member 55 in the disengaging direction (counterclockwise rotation in FIG. 2) will cause the latching member 50 to more or less pivot about the free end of the main portion 51 by displacement of the shorter leg portion 52 at least approximately parallelly to itself through the gap formed between the internal surface of the ring member 55 and the 90° intersection of the milled-in recesses 20 and 21. In other words, in the disengaging movement of the latching member 50, the shorter leg portion 52 is displaced generally in its own direction, as indicated by angle $\alpha$, when actuated by actuating member 58.

Figure 5A:
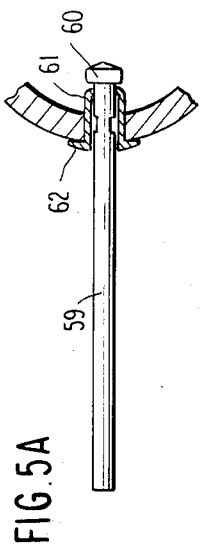
FIG. 5A is a cross-sectional view illustrating a commercially available pop rivet as used in the present invention when installed in the ring member of the coupling but before deformation thereof.
Figure 5B:
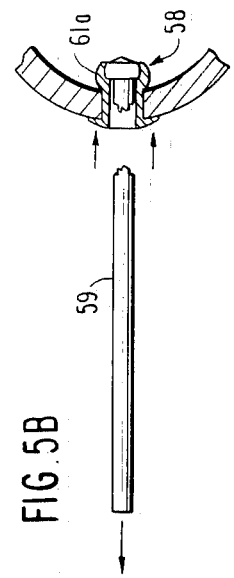
FIG. 5B is a cross-sectional view, similar to FIG. 5A, but showing the pop rivet in its deformed and secured position.

In a preferred embodiment of an all-metal construction in accordance with the present invention, the inwardly projecting actuating member 58 is realized by the use of a commercially available so-called pop rivet (FIG. 5A) which consists of a stem portion 59 having an enlarged head 60 and of a sleeve 61 surrounding the stem portion 59 and including a flange 62 of a diameter greater than the hole in the ring member 55, into which the rivet is inserted. When the flange 62 is applied against the outside of the ring member 55 while the stem 59 is pulled out, the enlarged head 60 forces the sleeve 61 to bulge outwardly along the inside of the ring member 55 until the stem 59 breaks. The stem 59 may be provided with reduced portions, as shown in FIG. 5A, to facilitate breaking when the sleeve 61 is enlarged into the more or less spherical configuration 61a as shown in FIG. 5B.

The thus-installed rivet 58 not only serves as actuating member for displacing the shorter leg portion 52 generally in its own direction, but additionally secures the ring member 55 against falling off the reduced diametric portion 19. Additionally, it prevents disassembly by unauthorized personnel, yet permits such disassembly by the manufacturer in case of needed repairs, by merely boring out the rivet 58, whereupon the ring member 55 can be slipped off the reduced diametric portion 19 and the remaining parts of the locking mechanism can be disassembled.

The coupling in accordance with the present invention is not only easy to manufacture accompanied by savings in material and weight, but is also easy to assemble. The valve structure 40 is assembled within chamber 15 in a conventional manner. With respect to the locking mechanism, it is only necessary to insert the latching member 50 into the milled-out recess 20, mount the spring 53 over the outside of the main portion 51 and then slip the ring member 55 over the reduced diametric portion 19 while compressing the spring 53. Thereafter, the pop rivet is installed by slipping the non-deformed rivet into the position shown in FIG. 5A and thereafter deforming the rivet as shown in FIG. 5B.

Figure 1:
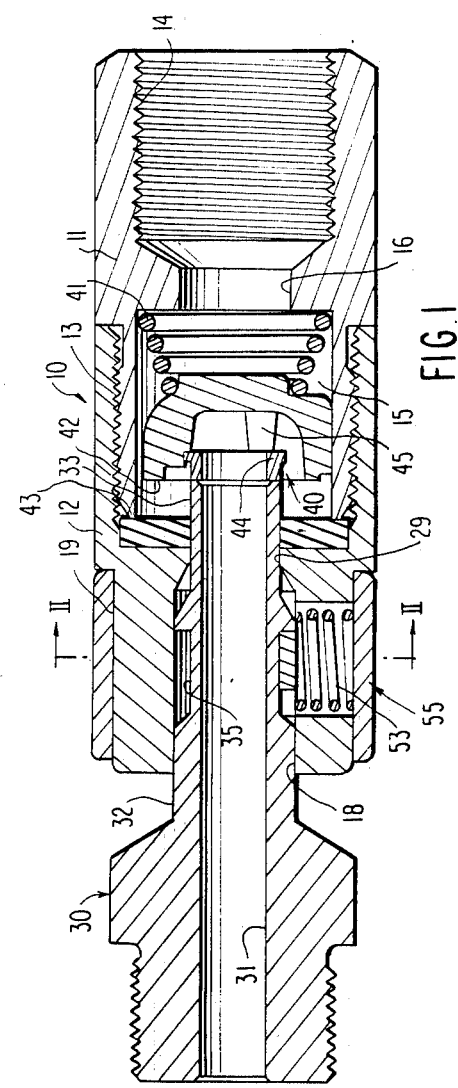
FIG. 1 is an axial longitudinal cross-sectional view through an all-metal coupling in accordance with the present invention.

The present invention which enables reduced diametric dimensions, is also applicable to a coupling in which the ring member 55 of FIGS. 1 and 2 is replaced by a plastic cap-like ring member 155 as shown in FIGS. 6 and 7 in which similar parts are designated by corresponding reference numerals of the 100 series. As can be seen in particular in FIG. 7, the inwardly projecting actuating member generally designated by reference numeral 158 which is molded integrally with the cap-like ring member 155 made of plastic material, includes an inclined actuating surface 158a substantially parallel to the end face of the shorter leg portion 152 to assure actuation of the latter by displacement thereof generally in its own direction.

The cap-like member 155 can be retained on the portion 119 of reduced diametric dimension in the manner described in my prior U.S. Pat. No. 4,357,037 by the use of a bead-like enlargement 157 which snaps into the annular groove 125 and/or by the use of a clip ring or snap ring (not shown).

Thus, the present invention assures by extremely simple means considerable savings in labor and material both in the manufacture and assembly of the coupling, permits a reduction in outside dimensions without reduction in through-flow capacity and provides for a competitively priced all-metal construction which is reliable in operation.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A coupling for a pressure gas line, comprising a sleeve-like first means intended to receive gas under pressure at one end thereof and including spring-loaded valve means for normally closing off said one end with respect to a bore leading to the other end of said first means, a tubularly shaped second means for conducting-on the gas under pressure, said tubularly shaped second means being provided with an annular groove, and further means for detachably connecting said first and second means with each other by inserting said tubularly shaped second means into the bore of said sleeve-like first means while at the same time opening said valve means to thereby establish a through-flow path for gas under pressure from the one end of the sleeve-like first means by way of the now-opened valve means into the interior of said tubularly shaped second means, said further means including a latching means operable to engage in the annular groove provided in said second means, said latching means being formed by a plate-like member operable to be guided in a cut-out provided in the part of said sleeve-like first means containing said bore and extending from the outside of said part to said bore substantially transversely to the axis of the coupling, a ring-like member rotatable on said part of the sleeve-like first means and having an inwardly projecting actuating means for engagement with said plate-like member to displace the same upon rotation of said ring-like member in its disengaging direction, and a spring between said ring-like member and said plate-like member for urging the plate-like member into its engaging position, characterized in that said part of the sleeve-like first means has a reduced diametric dimension relative to the diametric dimension of the section of the sleeve-like first means containing said valve means, and in that said plate-like member has a first substantially flat main portion in engagement with said spring and operable to engage in said annular groove and a second shorter leg portion bent at such obtuse angle to said flat main portion as to extend generally in the direction toward said inwardly projecting actuating means whereby the external diametric dimension of said ring-like member can be kept relatively small.

2. A coupling according to claim 1, wherein said reduced diametric dimension and the thickness of said ring-like member are so chosen that the coupling has substantially the same external diametric dimension over substantially the entire length of the sleeve-like first means including the part thereof carrying said ring-like member.

3. A coupling according to claim 1, in which said first means, said second means and said ring-like member are made of metal, characterized in that said inwardly projecting means consists of a rivet means having a relatively short inwardly projecting portion.

4. A coupling according to claim 3, wherein said inwardly projecting portion has an at least approximately part-spherical shape.

5. A coupling according to claim 4, wherein said rivet means is a pop rivet.

6. A coupling according to claim 3, wherein the shorter leg portion of said plate-like member is bent relative to the main portion at an angle of the order of 150°–170°.

7. A coupling according to claim 6, wherein said angle is about 165°.

8. A coupling according to claim 6, wherein said reduced diametric dimension and the thickness of said ring-like member are so chosen that the coupling has substantially the same external diametric dimension over substantially the entire length of the sleeve-like first means including the part thereof carrying said ring-like member.

9. A coupling according to claim 1, wherein said ring-like member is formed by a plastic cap-like element having said inwardly projecting actuating means formed integrally therewith, said inwardly projecting actuating means having a substantially flat surface operable to engage with the end surface of the shorter leg portion of said plate-like member, said flat surface being at such an angle that said flat surface is at least approximately parallel to the end surface of said shorter leg portion when engaging the latter.

10. A coupling according to claim 9, wherein said reduced diametric dimension and the thickness of said ring-like member are so chosen that the coupling has substantially the same external diametric dimension over substantially the entire length of the sleeve-like first means including the part thereof carrying said ring-like member.

11. A coupling according to claim 9, wherein the shorter leg portion of said plate-like member is bent relative to the main portion at an angle of the order of 60°–80°.

12. A coupling having relatively small external dimensions without reduction in the through-flow capacity, comprising a sleeve-like member forming a female part and a tubularly shaped member forming a male part adapted to be disengageably inserted into a corresponding bore of the sleeve-like member, said tubularly shaped member being provided with an external annular groove, and further means in said sleeve-like member for releasably locking said tubularly shaped member in its position fully inserted in said bore in which it also opens a valve means provided in said sleeve-like member, said further means essentially consisting of a stamped-out latching member, of a spring urging said latching member into its locking position, and of a ring-like member for releasing the locking action of said latching member by rotation of the ring-like member, said ring-like member being provided with an inwardly projecting actuating element operable to engage with said latching member, characterized in that said latching member consists of a flat main portion operable to engage with said annular groove and of a shorter leg portion bent at an acute angle of about 60° to about 80° with respect to the plane in which said main portion lies in the direction toward said actuating element.

13. A coupling according to claim 12, characterized in that said actuating member is formed by a pop rivet.

14. A coupling according to claim 12, characterized in that said actuating member is formed integrally with the ring-like member which is made of plastic material, and includes a substantially flat actuating surface operable to engage with the end face of the shorter leg portion, said substantially flat actuating surface being at least approximately parallel to said end face.

* * * * *